No. 651,569. Patented June 12, 1900.
H. HOWARD.
COMMERCIAL PRODUCTION OF PURE CARBONIC DIOXID.
(Application filed Dec. 9, 1899.)
(No Model.)
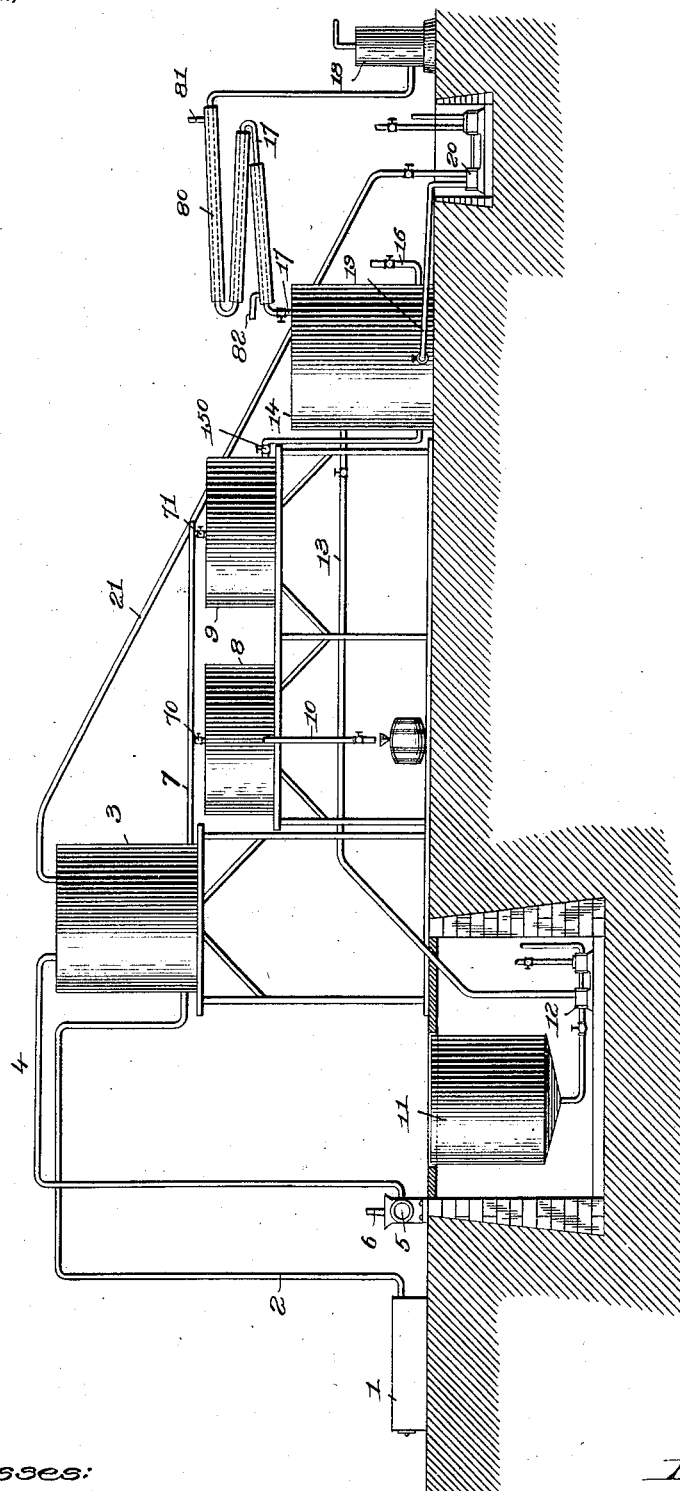
Witnesses:
Fred S. Greenhof.
George L. Dolbeau.
Inventor:
Henry Howard.
by Crosby Gregory
Attys.

UNITED STATES PATENT OFFICE.

HENRY HOWARD, OF BROOKLINE, MASSACHUSETTS.

COMMERCIAL PRODUCTION OF PURE CARBONIC DIOXID.

SPECIFICATION forming part of Letters Patent No. 651,569, dated June 12, 1900.

Application filed December 9, 1899. Serial No. 739,754. (No specimens.)

*To all whom it may concern:*

Be it known that I, HENRY HOWARD, of Brookline, county of Norfolk, State of Massachusetts, have invented an Improvement in Commercial Production of Pure Carbonic Dioxid, of which the following description, in connection with the accompanying drawing, is a specification, like numerals on the drawing representing like parts.

This invention has for its object the commercial production of pure carbonic dioxid ($CO_2$) in a rapid and economical manner, whereby by a simple and continuous process the $CO_2$ is obtained in a perfectly-pure condition at a low cost.

In the ordinary process of manufacturing bisulfite of soda ($NaHSO_3$) a solution of soda-ash is saturated with $SO_2$ until the bisulfite is formed, and during the process two reactions take place:

(1) $Na_2CO_3 + SO_2 = Na_2SO_3 + CO_2$.
(2) $Na_2SO_3 + SO_2 + H_2O = 2NaHSO_3$.

If pure $SO_2$ were used, we would have pure $CO_2$ evolved by (1); but on account of the much greater cost of pure $SO_2$ it is necessary to use, commercially, a cheaper, more dilute, and more impure source of $SO_2$, and this is conveniently found in the gas evolved from burning sulfur or pyrites or similar compounds. This "burner-gas," as it is termed, rarely tests over eleven per cent. of $SO_2$, the remainder being made up of nitrogen and an excess of oxygen, and burner-gas from pyrites frequently will not test over six per cent. $SO_2$. It will then be manifest that when such a gas is used in (1) as the source of $SO_2$ the resulting exit-gas will test very low in $CO_2$ and will be entirely unfit for compressing into liquid form or for other purposes which require pure $CO_2$.

In practicing my invention I prefer to carry it out in the production of bisulfite of soda, as I can thereby obtain not only commercial bisulfite as the main product, but also perfectly-pure $CO_2$ as a by-product, although the source of the $SO_2$ in the chemical reactions is burner-gas, as hereinbefore mentioned.

The drawing, in side elevation, shows one form of apparatus by or through the agency of which my invention may be successfully practiced.

Upon a suitable framework 50 are erected tanks 3, 8, and 9, the former having a gas-tight cover and being also elevated above the tops of the tanks 8 and 9, a sulfur-burner (indicated at 1) communicating with the lower portion of the tank 3 by a pipe 2 to conduct burner-gas to the tank, the pipe being carried up at least as high as the top of the tank, as at 30, to prevent passage of the liquid contents of the tank into the pipe. A suitable suction-pump 5 communicates by pipe 4 with the upper part of the tank 3, the pump-exit being shown at 6. In the tank 3 I have a batch of bisulfite formed, as will be described, and twice as large, preferably, as I wish to produce at a time, and one half of the batch is run into the smaller tank 8, and after settling it is ready for the market, and the bisulfite can be drawn off at 10. The other half of the batch is run into the tank 9, the discharge-pipe 7 having valves 70 and 71 to control the passage of contents of tank 3 to tanks 8 and 9, respectively. A conduit 15, having a suitable controlling-valve 150, leads from tank 9 to the $CO_2$ generator 14, a covered tank having about the capacity of tank 3 and preferably set below tank 9, so that the contents of the latter will discharge by gravity through conduit 15. This generator 14 contains a preferably-hot solution of soda-ash, ($Na_2CO_3$,) and into it the contents of tank 9 are run slowly, the following reaction taking place:

(3) $Na_2CO_3 + 2NaHSO_3 = 2Na_2SO_3 + H_2O + CO_2$.

The solution is kept at boiling temperature in the generator 14 to prevent any material amount of $CO_2$ from remaining in aqueous solution. Any suitable device is employed for heating the solution in the generater, such as a coil of steam-pipes, the inlet therefor being shown at 16, the steam being taken from any suitable source. The carbonic dioxid ($CO_2$) thus driven off from the generator 14 is separated from the steam by a condenser 80, having an inlet 81 for cold water and an outlet 82 for the heated water after circulation, the pipe 17 passing through the condenser from the generator, and the cold $CO_2$ is then washed with a soda solution in a scrubber 18 of common construction to remove any traces of $SO_2$ or sulfites which might possibly have escaped during reaction (3) or have been carried over mechanically. The pure $CO_2$ coming from the scrubber is now ready for use and can be stored in a gas-holder or other suitable receptacle. When the evolution of gas ceases in the generator 14, the neutral sulfite ($Na_2SO_3$) solution therein from reaction (3) is drawn off through a pipe 19 by a pump 20 and thence delivered by a pipe 21 to the tank 3, which may be termed the "converter," as the neutral-sulfite solution is therein converted into bisulfite-of-soda ($NaHSO_3$) solution by $SO_2$, preferably produced in the sulfur or pyrites burner 1.

The generator 14 and scrubber 18 are of course gas-tight, while the tanks 8, 9, and 11 have open tops, the soda-ash being dissolved in the latter tank, a pump 12 drawing the solution therefrom and pumping the charge to the generator through pipe 13, the various pipes and conduits of the apparatus in practice being provided with suitable valves for controlling the flow therethrough.

The vacuum-pump 5 produces a partial vacuum in the converter 3, causing the burner-gas to bubble up through the solution therein and furnishing draft for the burner, the nitrogen and oxygen escaping through the outlet 6, and the cycle of operations is completed, having started with a bisulfite-of-soda solution in the converter 3.

It will be seen that the reaction of (2) takes place in the converter as the $Na_2SO_3$ from (3) is saturated with $SO_2$ and that while half of each batch or charge is used for the bisulfite directly the other half is transformed into neutral sulfite with the evolution of pure $CO_2$, after which it is reconverted into bisulfite to form a fresh charge, the process being continuous in character.

Either the carbonate or bicarbonate of soda may be used, and if the latter is used the amount of $CO_2$ obtainable as a by-product in the manufacture of a given amount of bisulfite of soda will be doubled, the reaction being—

(4) 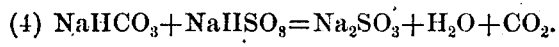

The sesquicarbonate of soda may also be used, or mixtures of the different carbonates of soda, in practicing my invention.

It is preferable to use the sodium carbonate in the form of a solution; but manifestly the process would not be departed from by the use of the carbonate in a dry state, the solution to which it is added having sufficient water to dissolve it and any suitable means being provided for agitating the mixture.

Having fully described my invention, what I claim, and desire to secure by Letters Patent, is—

1. In the production of pure $CO_2$, transforming bisulfite of soda into neutral sulfite by the action of a sodium carbonate in the presence of $H_2O$, with the evolution of $CO_2$; withdrawing the latter, and converting the remaining neutral sulfite into bisulfite of soda by saturation with $SO_2$.

2. The process of producing pure $CO_2$ from carbonate of soda by a weak or dilute $SO_2$ gas, which consists in converting neutral sulfite of soda into bisulfite by the action of weak $SO_2$ gas in the presence of water, to form a carrier for the $SO_2$, effecting the mixture of the said carrier with a sodium carbonate, with the evolution of pure $CO_2$; and separating the latter, leaving neutral sulfite of soda.

3. The herein-described process of producing pure $CO_2$ consisting in adding bisulfite of soda to a solution of a sodium carbonate; boiling the mixture to drive off $CO_2$ therefrom, and separating the aqueous vapor from the $CO_2$ by condensation.

4. The cyclical process of producing pure $CO_2$, consisting in adding bisulfite of soda to a sodium carbonate in the presence of $H_2O$; boiling the mixture to drive off $CO_2$; separating the aqueous vapor therefrom by condensation; adding $SO_2$ to the neutral-sulfite solution ($Na_2SO_3$) to form bisulfite of soda, and continuing the process.

5. The process of producing pure $CO_2$ in the manufacture of bisulfite of soda, which consists in dividing a charge of bisulfite solution, and transforming one portion thereof into neutral-sulfite solution by the action of a sodium carbonate, with the evolution of pure $CO_2$; withdrawing the latter, and converting the remaining neutral sulfite into bisulfite by $SO_2$ to form a fresh charge.

6. The process of recovering pure $CO_2$ as a by-product in the continuous manufacture of bisulfite of soda, which consists in dividing a charge of bisulfite solution and separating one half of the same as commercial bisulfite of soda; subjecting the other half to the action of a sodium carbonate and boiling to drive off $CO_2$; separating the aqueous vapor from the latter by condensation; converting the remaining neutral sulfite of soda into bisulfite by the action of $SO_2$ in the presence of water, to form a new charge, and repeating the steps as set forth.

7. The process of recovering pure $CO_2$ in the continuous manufacture of bisulfite of soda with burner-gas and a sodium carbonate, which consists in converting neutral sulfite of soda into bisulfite by saturation with $SO_2$ from burner-gas in the presence of water; dividing the charge of bisulfite so formed, and separating one portion thereof as commercial bisulfite; subjecting the other portion to the action of a carbonate of soda, to form neutral sulfite with the evolution of pure $CO_2$; separating the latter, and finally converting the remaining neutral sulfite into bisulfite as before, to form a fresh charge.

8. The herein-described process of producing pure $CO_2$, consisting in bringing together bisulfite of soda and a solution of a sodium carbonate in a closed vessel to prevent access of air, and withdrawing the $CO_2$ evolved by such mixture.

In testimony whereof I have signed my name to this specification in the presence of two subscribing witnesses.

HENRY HOWARD.

Witnesses:
JOHN C. EDWARDS,
EMMA J. BENNETT.